(12) United States Patent
Miyashita

(10) Patent No.: US 6,555,128 B2
(45) Date of Patent: Apr. 29, 2003

(54) FEEDS CONTAINING DOCOSAHEXAENOIC ACID AND/OR CONJUGATED DOCOSAHEXAENOIC ACID, AND A METHOD FOR FARMING FISHES BY USING SUCH FEEDS

(75) Inventor: Kazuo Miyashita, Hakodate (JP)

(73) Assignee: Hokkaido University, Sapporo (JP)

( * ) Notice: Subject to any disclaimer, the term of this patent is extended or adjusted under 35 U.S.C. 154(b) by 0 days.

(21) Appl. No.: 09/922,774

(22) Filed: Aug. 7, 2001

(65) Prior Publication Data

US 2002/0106398 A1 Aug. 8, 2002

(30) Foreign Application Priority Data

Aug. 15, 2000 (JP) ........................................ 2000-246230

(51) Int. Cl.$^7$ .......................... A61K 47/00; A23K 1/165
(52) U.S. Cl. ........................................ 424/439; 424/442
(58) Field of Search ................................ 424/439, 442; 426/549

(56) References Cited

U.S. PATENT DOCUMENTS 6,338,866 B1 * 1/2002 Criggall et al. ............. 426/549

FOREIGN PATENT DOCUMENTS

| JP | 8-98659 A | | 4/1996 |
| WO | WO 99/06585 | * | 2/1999 |

* cited by examiner

Primary Examiner—Thurman K. Page
Assistant Examiner—Blessing Fubara
(74) Attorney, Agent, or Firm—Burns, Doane, Swecker & Mathis, LLP

(57) ABSTRACT

A feed is disclosure includes docosahexaenoic acid and/or conjugated docosahexaenoic acid. This feed is used for farming fish such as steelheads.

8 Claims, 2 Drawing Sheets

Content of CDHA in lipid of the muscles of steelheads 21 weeks after starting the farming Effects of DHA, etc. upon the lipid composition in the internal organ and the muscles of steelheads 21 weeks after starting the farming Content of CDHA in lipid of the muscles of steelheads 21 weeks after starting the farming

FEEDS CONTAINING DOCOSAHEXAENOIC ACID AND/OR CONJUGATED DOCOSAHEXAENOIC ACID, AND A METHOD FOR FARMING FISHES BY USING SUCH FEEDS

BACKGROUND OF THE INVENTION

(1) Field of the Invention

The present invention relates to feeds containing docosahexaenoic acid and/or conjugated docosahexaenoic acid and a method for farming fish by using such feeds.

(2) Related Art Statement

Recently, the physiological activities of conjugated unsaturated fatty acids have been noted, which have been investigated by various organizations. For example, conjugated linoleic acid has been vigorously studied among the conjugated unsaturated fatty acids. More specifically, anticancer action, anti-arteriosclerosis action, antiallergic action, etc. are known as the physiological activities of conjugated linoleic acid.

However, although the physiological activities of conjugated linoleic acid have been actively studied, almost nothing is known about the physiological activities of conjugated unsaturated fatty acids other than conjugated linoleic acid.

Incidentally, farmed fishes contain more fat as compared with natural fishes, which degrades taste of the former. The excess accumulation of the fat is not preferable for the farmed fishes and consumers consuming such farmed fishes. In general, it is known that the composition of the lipid of the natural fish differs from that of the farmed fishes. With respect to the natural fishes, the lipid compositions depend upon the kinds of the fishes. There is a tendency that the content of the fat is smaller in the natural fishes than that of the farmed fishes and the content of triacylglycerol (TG) is also smaller in the former than in the latter. Differences in the lipid composition may influence the taste. Therefore, if the fat can be reduced and the lipid composition can be controlled by utilizing any physiological activity, high value-added farmed fishes can be preferably obtained without damaging the taste. However, a physiologically active material which reduces the fat and controls the lipid composition has not been known heretofore.

SUMMARY OF THE INVENTION

Under the circumstances, an object of the present invention is to provide a feed which can control the content of the fat and the lipid composition of the farmed fishes.

In order to accomplish the above object, the present inventor discovered that the body fat percentage and the lipid composition of the farmed fish can be controlled by adding docosahexaenoic acid and/or conjugated docosahexaenoic acid to a feed for the farmed fish.

The feed according to the present invention is characterized by comprising docosahexaenoic acid and/or conjugated docosahexaenoic acid.

In a preferred embodiment of the invention, the feed comprises 0.5% to 5% of docosahexaenoic acid and/or conjugated docosahexaenoic acid.

In another preferred embodiment, the structure of conjugated docosahexaenoic acid is at least one structure selected from a conjugated diene structure, a conjugated triene structure and a conjugated tetraene structure.

The present invention is also directed to a method for farming the fish by feeding it with any of the feeds mentioned above.

These and other objects, features and advantages of the invention will be apparent from the following description when taken in conjunction with the attached drawing, with the understanding that some modifications, variations and changes could be easily made with the skilled person in the art.

BRIEF DESCRIPTION OF THE DRAWINGS

For a better understanding of the present invention, reference is made to the drawings, wherein.

DETAILED DESCRIPTION OF THE INVENTION

Figure 1A:
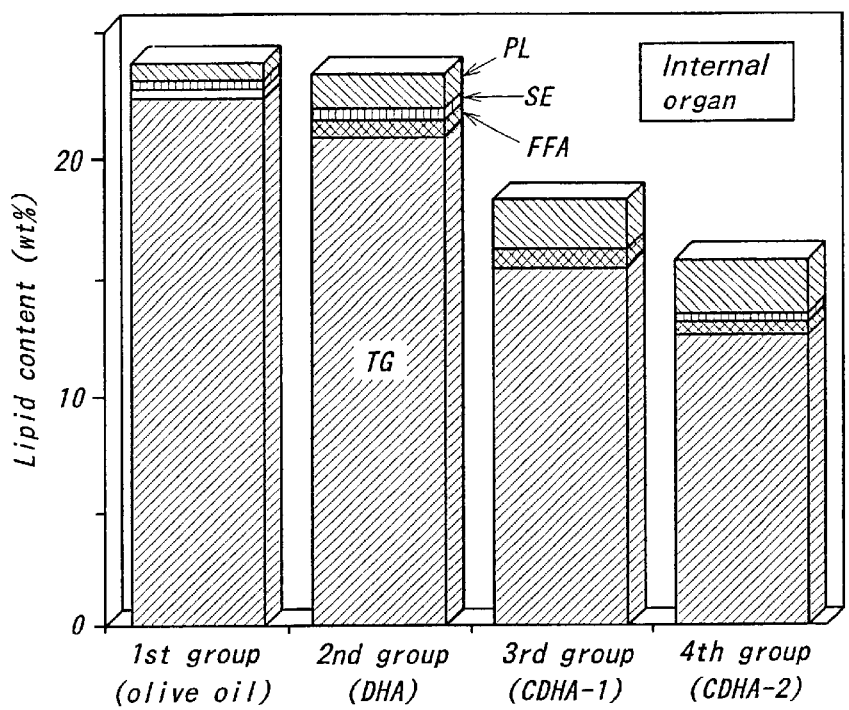
FIG. 1 is a diagram showing the contents of the lipid and the lipid compositions in internal organs and muscles of steelheads 12 weeks old after starting farming.

The feed according to the present invention comprises docosahexaenoic acid (DHA) and/or conjugated docosahexaenoic acid (CDHA). Docosahexaenoic acid is a $C22$ straight-chain higher unsaturated fatty acid. Docosahexaenoic acid is present in the form of glycerides in fish oils. In general, docosahexaenoic acid may be obtained by preparing a fatty acid mixture from a fish oil of tuna or bonito and treating the mixture with a solution of silver nitrate. Docosahexaenoic acid is an yellowish oily liquid. The conjugated docosahexaenoic acid is present as a compound having conjugated double bonds in the molecule. Conjugated docosahexaenoic acid can be obtained by isomerization of docosahexaenoic acid with an alkali.

No limitation is posed upon the feed according to the present invention so long as the feed contains docosahexaenoic acid and/or conjugated docosahexaenoic acid. The feed may contain docosahexaenoic acid alone or conjugated docosahexaenoic acid alone. The feed may contain both of docosahexaenoic acid and conjugated docosahexaenoic acid. Preferably, the feed contains 0.5% to 5.0% of docosahexaenoic acid and/or conjugated docosahexaenoic acid. More preferably, the feed contains 0.5% to 2% of docosahexaenoic acid and/or conjugated docosahexaenoic acid. The feed may contain 0.5% to 5.0 wt % of docosahexaenoic acid alone, or the feed may contain 0.5% to 5.0% of conjugated docosahexaenoic acid alone. The reason for this range is that if the content is more than 5.0%, the fat may be too reduced, whereas if it is less than 0.5 wt %, the body fat percentage or the lipid composition cannot be largely controlled. However, if the content of docosahexaenoic acid and/or conjugated docosahexaenoic acid falls outside the above range, the feed may be used, while feeding conditions such as the number of feedings per day are appropriately changed.

In the feed according to the present invention, the structure of conjugated docosahexaenoic acid is preferably at least one structure selected from a conjugated diene structure, a conjugated triene structure and a conjugated tetraene structure. The reason why conjugated docosahexaenoic acid (CDHA) is used is that the content of the fat can be more reduced and the lipid composition can be more adjusted.

Each of the conjugated diene structure, the conjugated triene structure and the conjugated tetraene structure may be used alone, or two or more of such structures may be used in a mixed manner.

The feed comprising docosahexaenoic acid and/or conjugated docosahexaenoic acid may be produced by mixing only docosahexaenoic acid and/or conjugated docosahexaenoic acid to a commercially available compounded feed or by mixing docosahexaenoic acid and/or conjugated docosahexaenoic acid into a fish oil or a plant oil and then incorporating the mixture into the compounded feed commercially available.

Docosahexaenoic acid may be produced by an ordinary method. Conjugated docosahexaenoic acid can be produced by isomerization of double bonds of docosahexaenoic acid under the presence of an alkali catalyst, for example. More specifically, ethyl docosahexaenoate or a DHA-containing oil and fat is stirred in a solvent such as dimethyl formamide in the presence of an alkali catalyst for a given time period. As the alkali catalyst, potassium t-butoxide, potassium hydroxide, sodium hydroxide or the like may be used. The temperature may be ordinary temperature. In order to prevent oxidation of the oil and fat during the reaction, the reaction is preferably carried out in the dark in the presence of an inert gas such as nitrogen. The reaction time is preferably 30 minutes to 1 hour. In this case, the content of the conjugated triene structure and the conjugated tetraene structure in the conjugated docosahexaenoic acid can be increased by increasing the amount of DHA and/or that of the alkali catalyst.

In the present invention, docosahexaenoic acid and/or conjugated docosahexaenoic acid may be appropriately used in the ordinary feed. As the feed, a compounded feed for trout manufactured by Oriental Co., Ltd., a compounded feed for yellowtail/young yellowtail manufactured by Nihon Compounded Feed Co., Ltd., a compounded feed for trout manufactured by Hinon Compounded Feed Co., Ltd., an initial stage feed manufactured by Kyowa Hakkou Co., a compounded feed manufactured by Nisshin Co., Ltd.

According to the fish-farming method of the present invention, fish is farmed by feeding it with the feed containing docosahexaenoic acid and/or conjugated docosahexaenoic acid. As the feed containing docosahexaenoic acid and/or conjugated docosahexaenoic acid, recitation is made of (1) a feed containing 0.5 to 5 wt % of docosahexaenoic acid and/or conjugated docosahexaenoic acid, (2) a feed containing docosahexaenoic acid and/or conjugated docosahexaenoic acid in which the structure of conjugated docosahexaenoic acid is at least one structure selected from a conjugated diene structure, a conjugated triene structure and a conjugated tetraene structure.

A way of feeding the feed is not particularly limited, but the feed can be fed in the same manner as for ordinary feeds. When a feed containing a small amount of preferably 0.5 to 5% of DHA and/or CDHA is continuously fed to fishes, they can be farmed while their fat percentage and the lipid composition are being controlled.

When the content is to be decreased, the content of DHA and/or CDHA in the feed is increased, whereas if the fat content is to be increased, the content of DHA and/or CDHA in the feed is decreased. Thus, the fat content and the lipid composition can be arbitrarily controlled.

EXAMPLES

Although examples of the present invention will be explained hereinafter, the invention is not limited to them.

Example 1

Effects of ethyl docosahexaenoate and conjugated ethyl docosahexaenoate upon accumulation of the fat and the lipid composition were examined by feeding both ethyl esters to rainbow trouts.

Measuring conditions were as follows.

1) Sample fish: Oncorhynchus, steelheads 3 months old after birth
2) Farming condition: water temperature 10° C., each group 60 fishes
3) Feed (fundamental feed: compounded feed for oriental trouts)
   1st group: fundamental feed +olive oil (5 wt %)
   2nd group: fundamental feed +olive oil (3 wt %) +ethyl docosahexaenoate (0.5 wt %)
   3rd group: fundamental feed +olive oil (4.5 wt %) +ethyl conjugated docosahexaenoate (0.5 wt %)
   4th group: fundamental feed +olive oil (3 wt %) +ethyl conjugated docosahexaenoate (2 wt %)

Conjugated ethyl docosahexaenoate used is obtained by isomerization of double bonds of ethyl docosahexaenoate in the presence of an alkali catalyst, and its composition consisted of 81.4% of conjugated ethyl docosahexaenoate and 18.6% of ethyl docosahexaenoate. More specifically, conjugated ethyl docosahexaenoate consisted of 57.4% of conjugated diene ester, 12.0% of conjugated triene ester, 12.0% of conjugated tetraene ester and 18.6% of ethyl docosahexaenoate. 12.0% of conjugated tetraene ester and 18.6% of ethyl docosahexaenoate.

Steelheads used, which were 3 months old after birth (average weight 0.82 g) and divided into four groups each consisting 60 steelheads, were farmed at a water temperature of about 10° C. for 21 weeks.

Figure 1B:
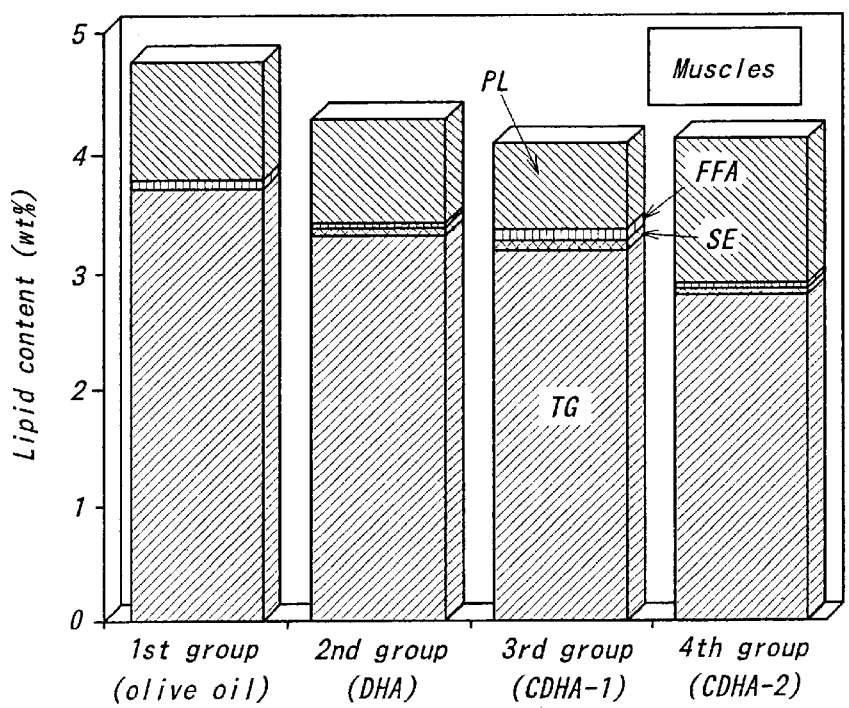

Effects of the feeds upon the internal organs and the lipid contents of the steelheads 21 weeks old after starting the farming were examined. Results are shown in FIG. 1. The concrete lipid compositions in the internal organs are shown in Table 1, and the concrete lipid compositions in muscles shown in Table 2.

TABLE 1

Content and composition of the lipid in the internal organ

| Lipid content | Lipid composition (%) | | | |
|---|---|---|---|---|
| (%) | TG | FFA | SE | PL |
| 1st group | 23.8 | 94.0 | 1.5 | 1.3 | 3.3 |
| 2nd group | 23.2 | 89.6 | 3.0 | 1.6 | 5.8 |
| 3rd group | 18.2 | 85.0 | 3.6 | 0.6 | 10.8 |
| 4th group | 15.8 | 79.7 | 3.5 | 2.1 | 14.8 |

TABLE 2

Content and composition of the lipid in tbe internal organ

| Lipid content | Lipid composition (%) | | | |
|---|---|---|---|---|
| (%) | TG | FFA | SE | PL |
| 1st group | 4.9 | 75.9 | 0.5 | 1.2 | 22.4 |
| 2nd group | 4.3 | 76.6 | 1.7 | 0.7 | 21.0 |
| 3rd group | 4.2 | 75.7 | 2.3 | 2.6 | 19.5 |
| 4th group | 4.2 | 66.1 | 1.3 | 1.2 | 31.6 |

As is clear from FIG. 1, as compared with the steelheads farmed while being fed with feeds containing neither ethyl docosahexaenoate or conjugated ethyl docosahexaenoate (1st group), those fed with feeds containing ethyl docosahexaenoate or conjugated ethyl docosahexaenoate (2nd group to 4th group) exhibited lower lipid contents in the internal organs and muscles. In particular, the steelheads in 3rd and 4th groups fed with the feed containing conjugated ethyl docosahexaenoate exhibited conspicuously lowered lipid contents in the internal organs.

Further, the administration of conjugated ethyl docosahexaenoate decreased triacylglycerol (TG) in the lipid of the steelhead tissue, and increased the phosphorus lipid (PL) increased. Particularly, the phosphorus lipid (PL) in the muscle increased in the 4th group with the feed containing conjugated ethyl docosahexaenoate.

The reason why conjugated docosahexaenoic acid (CDHA) reduce TG is considered as follows. That is, (1) CDHA suppresses hydrolysis of TG in the lipoprotein in blood and thus reduces capturing of the free fatty acid into the fat cells. (2) Owing to this, reduction in capturing of the free fatty acid into the fat cells decreases the amount of TG synthesized in the fat cells, thereby suppressing the accumulation of the fat (TG) in the fat tissues. In this case, it is considered that CDHA suppresses the activity of the lipoprotein lipase which hydrolyzes TG in the lipoprotein in blood.

It is confirmed from the above results that when the farming fish absorbs docosahexaenoic acid and/or conjugated docosahexaenoic acid, the fat percentage and the lipid composition of the farming fishes can be controlled, and the fishes giving tastes similar to those of natural fishes can be obtained.

Example 2

In the same manner as in Example 1, steelheads 3 months old after birth were farmed at a water temperature of about 10° C. for 21 weeks, and the content of CDHA was examined.

Figure 2:
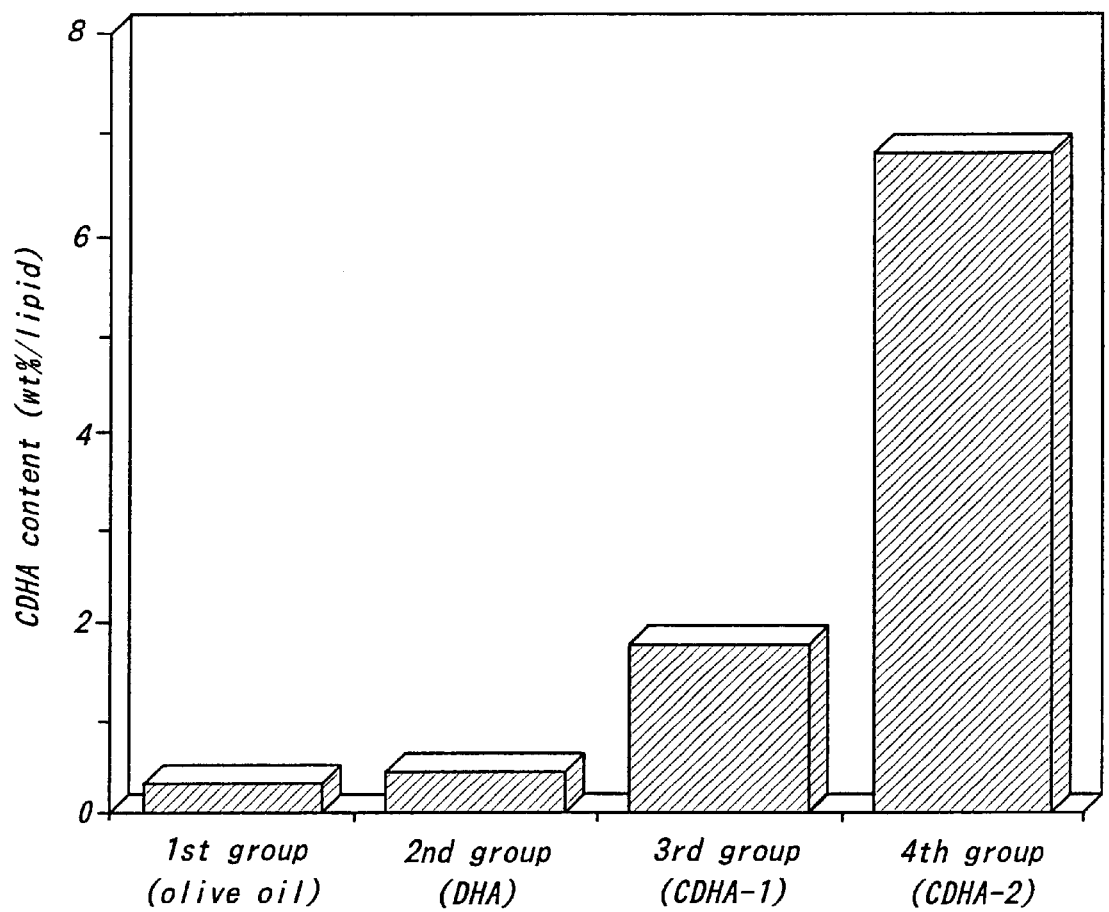
FIG. 2 is a diagram showing the contents of conjugated docosahexaenoic acid (CDHA) and the lipid compositions in the lipid of the muscles of the steelheads 12 weeks old after starting the farming.

Results are shown in FIG. 2. As is clear from FIG. 2, the contents of the CDHA in the lipid of the muscles in groups 3 and 4 are high. Thus, the steelheads having high contents of CDHA as a functional ingredient could be obtained.

The farmed fishes having high contents or CDHA can be obtained by making them absorb CDHA incorporated into the feed. It is also confirmed that CDHA absorbed in the farming fishes renders the fat percentage and the lipid composition to be satisfactory, which maintains the taste similar to that of the natural fishes.

The feed according to the present invention has the advantage that docosahexaenoic acid and/or conjugated docosahexaenoic acid contained in the feed can reduce the content of the fat.

The feed according to the present invention also has the advantage that docosahexaenoic acid and/or conjugated docosahexaenoic acid contained in the feed can control the lipid composition.

What is claimed is:

1. A feed comprising conjugated docosahexaenoic acid or a mixture of docosahexaenoic acid and conjugated docosahexaenoic acid.

2. The feed set forth in claim 1, which comprises 0.5 to 5 wt % of conjugated docosahexaenoic acid or a mixture of docosahexaenoic acid and conjugated docosahexaenoic acid.

3. The feed set forth in claim 2, wherein the structure of conjugated docosahexaenoic acid is at least one structure selected from a conjugated diene structure, a conjugated triene structure and a conjugated tetraene structure.

4. A method for farming fish, comprising the step of feeding the fish with the feed set forth in claim 2.

5. The method set forth in claim 4, wherein the fish is a steelhead, Oncorhynchus.

6. The feed set forth in claim 1, wherein the structure of conjugated docosahexaenoic acid is at least one structure selected from a conjugated diene structure, a conjugated triene structure and a conjugated tetraene structure.

7. A method for farming fish, comprising the step of feeding the fish with the feed set forth in claim 1.

8. The method set forth in claim 7, wherein the fish is a steelhead, Oncorhynchus.

* * * * *